United States Patent [19]
Lu et al.

[11] Patent Number: 5,616,993
[45] Date of Patent: Apr. 1, 1997

[54] METHOD AND APPARATUS FOR SWITCHING A MOTOR BETWEEN BIPOLAR AND UNIPOLAR MODE

[75] Inventors: Li-Hsin D. Lu, San Jose; Karl M. Schlager, Campbell, both of Calif.

[73] Assignee: SGS-Thomson Microelectronics, Inc., Carrollton, Tex.

[21] Appl. No.: 331,370

[22] Filed: Oct. 27, 1994

[51] Int. Cl.⁶ .................................................. H02P 6/00
[52] U.S. Cl. .................................... 318/254; 318/439
[58] Field of Search ........................... 318/138, 254, 318/439

[56] References Cited

U.S. PATENT DOCUMENTS 5,210,474  5/1993  Oswald ................................. 318/254
5,225,759  7/1993  Endo et al. .......................... 318/778

*Primary Examiner*—Bentsu Ro
*Attorney, Agent, or Firm*—Theodore E. Galanthay; Lisa K. Jorgenson

[57] ABSTRACT

A method and apparatus for switching a motor between bipolar and unipolar mode. During each phase of the bipolar mode, one of the coils floats and has a back emf. In the method, first, a mode change signal requesting a change between the bipolar mode and the unipolar mode is received. Second, the back emf across the floating coil is monitored. Third, a point in time when the back emf equals the center tap voltage is detected. Last, the motor is switched between the bipolar mode and the unipolar mode at a point away from point in time when the back emf across the floating coil equals the center tap voltage. Various circuitry is also disclosed for switching a motor between a bipolar mode and a unipolar mode.

13 Claims, 3 Drawing Sheets

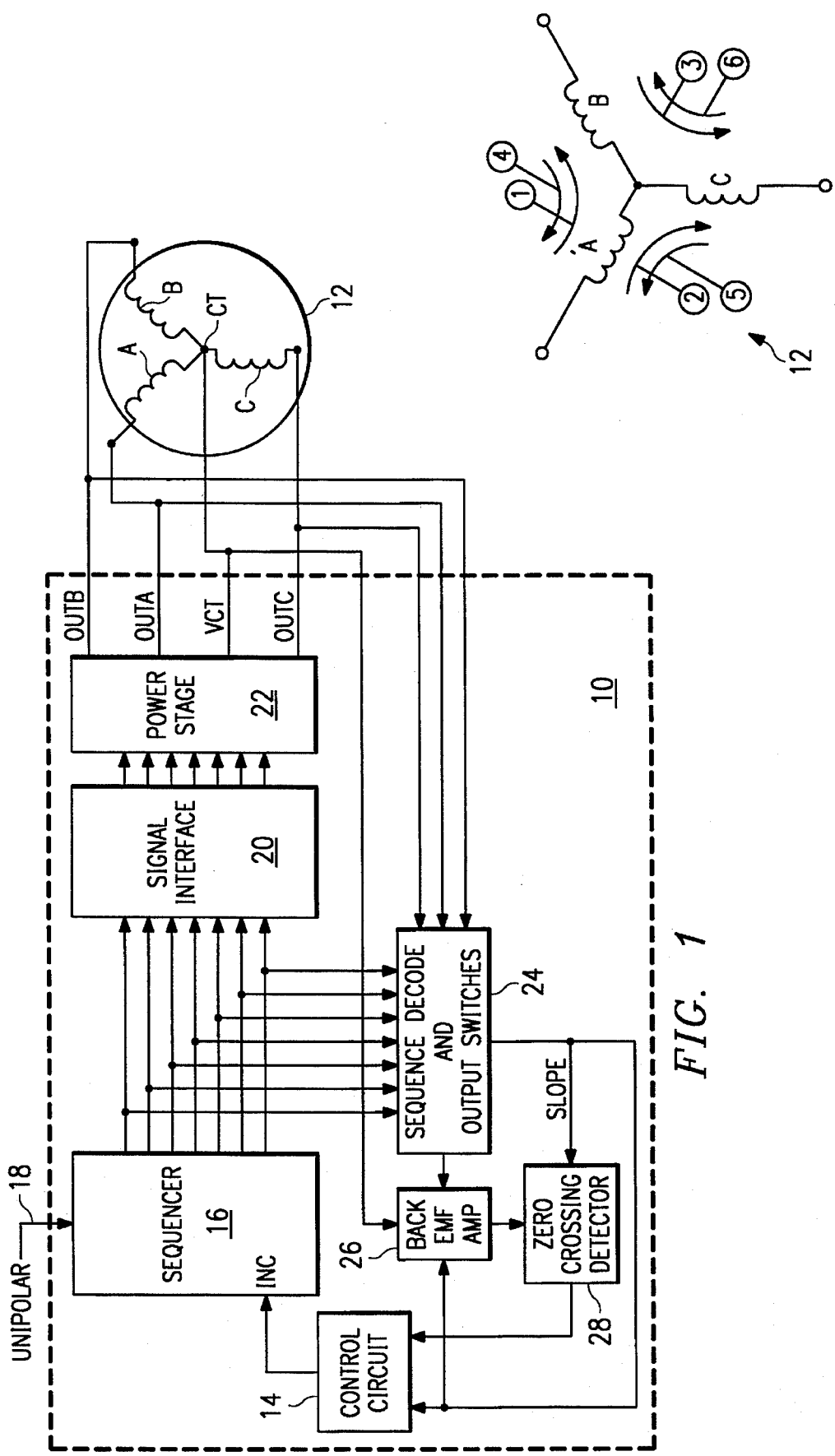

5,616,993

METHOD AND APPARATUS FOR SWITCHING A MOTOR BETWEEN BIPOLAR AND UNIPOLAR MODE

This invention relates to polyphase motors, and is more particularly directed to a method and apparatus for switching a motor between bipolar and unipolar mode.

BACKGROUND OF THE INVENTION

The present invention relates to polyphase dc motors in general, but has particular application with three phase dc motors of the brushless type which are used for rotating data media. Such motors are often found in computer related applications, including hard disk drives, CD ROM drives, floppy disks, and the like. In computer applications, such motors are becoming more popular due to their reliability, low weight, and accuracy.

Three phase motors typically are thought of as having a stator with three coils arranged in the shape of a "Y" configuration, with the common connection at the center of the "Y" known as the stator center tap. Note, however, that often more than three coils are used. In any instance, the stator coils may be analyzed in terms of the three "Y" connected coils. To operate the motor, current is passed through one or more of the coils, and switched (referred to as "commuted" or the act of "commutation") at desired times to effect changing magnetic fields, thereby causing the magnetic rotor to rotate with respect to the stator coils.

The present invention applies to such commutating configurations which operate in at least two modes, namely, a bipolar mode or a unipolar mode. In both modes, different current paths through the coils are created by selectively turning on and off power to the coils in a sequence. In the bipolar mode, for each path in the sequence, only two of the three coils conduct while the third coil floats. Further, the sequence is defined so that when the floating coil is switched into the current path, current flows through the newly added coil in the same direction which it flowed through the coil which is now removed from the path. In this manner, six sequences are defined for each electrical cycle of a three phase motor. In the unipolar mode of operation, only one coil conducts current while the other two coils float. The center tap may be coupled to the voltage source or grounded.

The contrast of the bipolar and unipolar (or "uni-coil") modes are detailed in U.S. patent application Ser. No. 08/123,347, entitled "Method And Apparatus For Starting A Sensorless Polyphase DC Motor In Dual Coil Mode And Switching To Single Coil Mode At Speed," filed Sep. 17, 1993, having inventor Scott Cameron, and this Application is hereby fully incorporated herein by reference. As an overview, however, a brief description follows demonstrating the effect of each mode and the benefits of switching from bipolar mode to unipolar mode once a sufficient rotor speed is achieved.

The maximum achievable motor speed in the bipolar mode is related to the maximum torque that the coil arrangement can generate, and the maximum torque is related to the maximum current available for passing through both coils. The goal is to achieve a maximum torque with a fixed current but, as always, the current is determined by the available power. However, as known in the art, a spinning rotor induces a back emf in the stator coils and, as described below, the back emf effectively reduces the amount of source voltage and, therefore, reduces the amount of current available to pass through the coils.

The back emf effect is understood in considering the operation of the motor from start-up to a satisfactory speed. Before the rotor begins to spin, there is no back emf. In contrast, at increasing rotor speeds, the back emf increases and, for a given voltage, correspondingly limits the amount of current that can be applied to the coils (again, limiting the torque because of the limit on current). Therefore, in order to reduce the back emf (and its current limiting effect), the stator is switched to the unipolar mode, thereby halving the number of flux linkages or coil turns in the current path (i.e., by reducing the number of coils from two to one). By reducing the coil turns, the back emf is reduced, thereby freeing more current to drive the single stator coil in the unipolar mode. As detailed in the above-incorporated patent application, the additional current then further increases the speed of the motor from its point at which back emf created a limitation to torque in the bipolar mode.

From the above, one skilled in the art will recognize that the combined use of both the bipolar and unipolar mode increases efficiencies and operability as described and incorporated above. The present invention further improves product performance and reduces otherwise existing problems by controlling the timing of the switch between the bipolar mode and the unipolar mode.

It is therefore an object of the present invention to provide a method and apparatus for switching a motor between bipolar and unipolar mode at a controlled time.

It is a further object of the present invention to provide such a method and apparatus for switching a motor between bipolar and unipolar mode at or near the midpoint between zero crossings of the back emf of the floating coil.

It is a further object of the present invention to provide such a method and apparatus for switching a motor between bipolar and unipolar mode at or near the point of commutation.

It is a further object of the present invention to provide such a method and apparatus for switching a motor between bipolar and unipolar mode with minimal affect on spindle sequencing.

It is a further object of the present invention to provide such a method and apparatus for switching a motor between bipolar and unipolar mode with minimal affect on motor torque.

It is a further object of the present invention to provide such a method and apparatus for switching a motor between bipolar and unipolar mode at or near the point of high-to-high commutation.

Still other objects and advantages of the present invention will become apparent to those of ordinary skill in the art having references to the following specification together with its drawings.

SUMMARY OF THE INVENTION

In the preferred embodiment, the present invention includes a method and apparatus for switching a motor between the bipolar and unipolar mode.

The inventive method is operable to switch a motor between a bipolar mode and a unipolar mode, wherein the motor comprises a center tap and a plurality of coils. During each phase of the bipolar mode, one of the coils floats and has a back emf. In the method, first, a mode change signal requesting a change between the bipolar mode and the unipolar mode is received. Second, the back emf across the floating coil is monitored. Third, a point in time when the back emf equals the center tap voltage is detected. Last, the motor is switched between the bipolar mode and the unipolar mode at a point away from point in time when the back emf across the floating coil equals the center tap voltage.

Various circuitry is also disclosed for switching a motor between a bipolar mode and a unipolar mode. In one embodiment, the circuitry includes an input for receiving a mode change signal requesting a change between the bipolar mode and the unipolar mode. The circuit further includes circuitry for detecting a commutation cycle, and circuitry for switching between the bipolar mode and the unipolar mode in response to the mode change signal and the circuitry for detecting a commutation cycle.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a simplified electrical schematic block diagram of a motor controller and a motor in which the present invention may be incorporated;

FIG. 2b illustrates the current path for the six phases of the bipolar mode;

DETAILED DESCRIPTION OF THE PREFERRED EMBODIMENTS

Figure 2A:
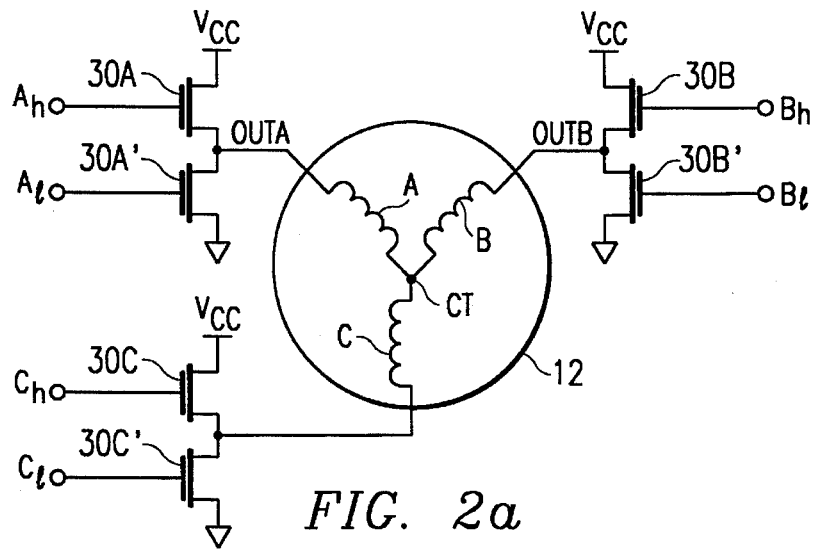
FIG. 2a illustrates a motor and a simplified schematic of the power circuitry driving each of the coils of the motor in the bipolar mode.

The preferred embodiment of the present invention and its advantages are best understood by referring to FIGS. 1–5 of the drawings, like numerals being used for like and corresponding parts of the various drawings.

FIG. 1 illustrates a simplified electrical schematic block diagram of a motor controller 10 and a motor 12 in which the present invention may be incorporated. Note that the diagram of FIG. 1 is simplified to demonstrate underlying principles of motor operation and control, with it understood that one skilled in the art could make various additions and/or substitutions while still benefitting from the invention as described below. For additional details on the structure and operation of polyphase DC motors, the reader is referred to U.S. Pat. No. 5,306,988, entitled "Method And Apparatus For Operating Polyphase DC Motors," issued Apr. 26, 1994, which is hereby incorporated herein by reference. Motor controller 10 is preferably integrated onto a single microcontroller chip, but also could be constructed using discrete components. For purposes of discussing operation, motor 12 is illustrated as only including three stator coils A, B, and C; however, it is understood that various other mechanical and electrical components, such as a motor rotor, are also included as known in the motor art.

In general, the three coils of motor 12 are connected in a "Y" configuration, and each coil receives an energizing voltage (i.e., OUTA, OUTB, and OUTC, respectively) from output terminals of controller 10. As stated above, the motor of the present invention operates in at least two modes, namely, a bipolar mode and a unipolar mode. Thus, the particular energizing or deactivation of a coil or coils depends on the mode of operation, as well as the sequential operation within a given mode. Further, the center of the "Y" configuration, known as the motor center tap ("CT"), is coupled to controller 10 so controller 10 may measure the CT potential during bipolar mode, and provide a biasing signal during unipolar mode. Although not shown, note also that motor parameters are commonly fed back to controller 10 in addition to measuring center tap voltage. Note also that although the preferred embodiment of the invention is described with regard to a three phase motor, the principles of the invention can be advantageously applied to polyphase motors in general, and that the center tap connection may be simulated in some applications.

Controller 10 includes various components, only some of which are shown for simplifying the overall discussion, and with those shown being in block fashion to represent the basic functionality of controller 10. Thus, numerous alternative or additional components may be included, such as shown in the incorporated patent and/or patent application cited above. Further, the blocks shown in FIG. 1 are merely by way of example, with it understood that various circuits, functions and/or signals could be re-arranged by a person skilled in the art without departing from the present invention. As shown, controller 10 includes a control circuit 14 which receives various inputs, including feedback data in response to ongoing motor operation, to control the overall operation of controller 10 and, thus, motor 12.

Control circuit 14 is coupled to a sequencer 16. For reasons detailed below, control circuit 14 also includes a unipolar input 18 for receiving a signal indicating a request for the mode of operation of motor 12 to change between bipolar mode and unipolar mode. Particularly, in the preferred embodiment, motor 12 defaults to operate in the bipolar mode, but will switch to unipolar mode in response to a proper request. Further, motor 12 defaults back to the bipolar mode once the request is no longer maintained. Note that the precise timing of the switching to either the bipolar or unipolar mode is described in greater detail below. Note also that although unipolar input 18 suggests an external input and external signal, the present invention also may be incorporated into a circuit wherein the unipolar mode request is internally generated.

Sequencer 16 outputs control signals so that the coils of motor 12 are selectively energized through a given sequence (either in bipolar or unipolar mode). Particularly, control circuit 14 increments sequencer 16 so that it moves from one sequence to the next sequence, and so forth, each time changing the energy configuration applied to the motor coils and, thus, changing the field imposed on the motor rotor. Particularly, for each sequence, sequencer 16 outputs a set of control signals to signal interface 20. Signal interface passes these signals (absent some other command or reason to inhibit the passage of signals) to a power stage 22. Power stage 22 includes power components, such as power MOSFETs, to drive the various coils and center tap of motor 12. Accordingly, for a given stage in the sequence, the appropriate combination of power (via OUTA, OUTB, OUTC, and in unipolar mode, also VCT) passes to motor 12, with the combination changing for each stage in the sequence, thereby advancing the motor rotor.

A feedback path is formed within controller 10 so that current motor operation may be used to control continuing motor operation. Thus, output terminals OUTA, OUTB, and OUTC are returned to a block of sequence decode and output switches 24. Switches 24 selectively couple these signals to a back emf amplifier 26 for evaluating the back emf of the floating coil of motor 12. Further, the center tap voltage, VCT, and a slope output from switches 24, are also coupled to back emf amplifier 26. Zero crossing detector 28 determines the zero crossing point by comparing the back emf to the center tap voltage (i.e., VCT) and, concluding the point is reached when the two voltages are equal. This zero crossing point determination is coupled to control circuit 14. Sequence decode and output switches 24 also output the slope of the back emf for the floating coil during each particular sequence, that is, whether each such signal is negative-to-positive going, or positive-to-negative going. As known in the art, such an indication is used to ensure accuracy of motor operation. For example, the slope indication prevents zero crossing detector 28 from wrongfully responding to a sudden voltage spike as opposed to a true zero crossing event. This slope information is also coupled to control circuit 14.

FIG. 2a illustrates motor 12 and a simplified schematic of the power circuitry driving each of the coils of motor 12 in the bipolar mode. Each of stator coils A, B, and C is driven by a pair of MOSFETs. Particularly, stator coil A is coupled between a pair of FETs 30A and 30A', coil B is coupled between a pair of FETs 30B and 30B' and stator coil C is coupled between a pair of FETs 30C and 30C'.

Each FET pair is coupled to source/sink current in the same general fashion. For example, referring to FETs 30A and 30A', the top transistor is coupled to a source voltage (e.g., $V_{cc}$) while the bottom transistor is coupled to a voltage lower than the source voltage (e.g., ground). Note that although ground is shown as the low side potential, in the preferred embodiment, additional circuitry may be coupled between transistor 30A' and ground to limit the current flow without completely grounding transistor 30A'. In view of the above, for purposes of this document (and as known in the art), each top transistor of a respective pair is known as the high side transistor (because it is coupled to a relatively high potential, namely, $V_{cc}$), while each bottom transistor of a respective pair is known as the low side transistor (because it is coupled to a relatively low potential, namely, ground). The gates of each FET pair are connected to respective control signals (e.g., $A_h$ and $A_l$ for transistor 30A and 30A', respectively), where the subscript of each control signal designates whether the corresponding transistor is a high side transistor or a low side transistor. Note also that under typical operation for a conducting coil, the operation of these transistors is complementary, that is, only one of either the high side or low side transistors is on, while the other is off (i.e., gate connected to a low signal).

As briefly discussed in the Background, the motor coils are selectively energized in the bipolar mode such that each current path in the sequence includes two of the three stator coils, while the third coil floats. Although the term "floats" is used herein to describe the coil which is not in the instantaneous current path, note that the coils may not actually float but, in the alternative, may be connected to a tristated output when no drive current is being applied. Particularly, to render a coil floating, typically both its high side and low side transistors are off (i.e., gate grounded). Table 1 below, demonstrates the current path in each of the six phases of the bipolar mode.

TABLE 1

| Phase | Current Flows From Coil | To Coil | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

FIG. 2b illustrates the stator coils of motor 12 and the current path for the six phases of Table 1, with each current path labeled by its respective phase. Thus, FIG. 2b demonstrates that when a floating coil is switched into the current path, current flows through it in the same direction which it flowed through the coil which was in the path in the immediately preceding phase.

Returning to FIG. 2a, the operation of the transistor pairs to achieve the sequence of Table 1 is now discussed. In phase 1, current flows from coil A to coil B; thus, transistors 30A and 30B' are on, while transistors 30A' and 30B are off. Consequently, in accordance with the nomenclature defined above, the high side is on for coil A and the low side is on for coil B. In phase 2, again current flows from coil A, but to coil C instead of coil B. Thus, transistors 30A and 30A' remain unaffected, but transistor 30B' is now allowed to float (thereby discontinuing current flow to coil B) and transistor 30C' is turned on (thereby establishing the current path through coil C). In other words, the low side of coil C conducts instead of the low side of coil B. This switching operation, therefore, is known as a low side to low side commutation because the commutation is performed by turning one low side transistor (e.g., 30B') off while turning another low side transistor (e.g., 30C') on.

In phase 3, current continues to flow through coil C, but is sourced from coil B instead of coil A. Thus, to accomplish the commutation from phase 2 to phase 3, the high side of coil B conducts instead of the high side of coil A. This operation, therefore, is known as a high side to high side commutation. In phase 4, current continues to source through coil B, but flows to coil A instead of coil C. Thus, to accomplish the commutation from phase 3 to phase 4, the low side of coil B conducts instead of the low side of coil C; again, therefore, the change in current paths is a low side to low side commutation. The above process continues through all phases of the bipolar sequence, and is detailed below in connection with FIG. 2c.

Figure 2C:
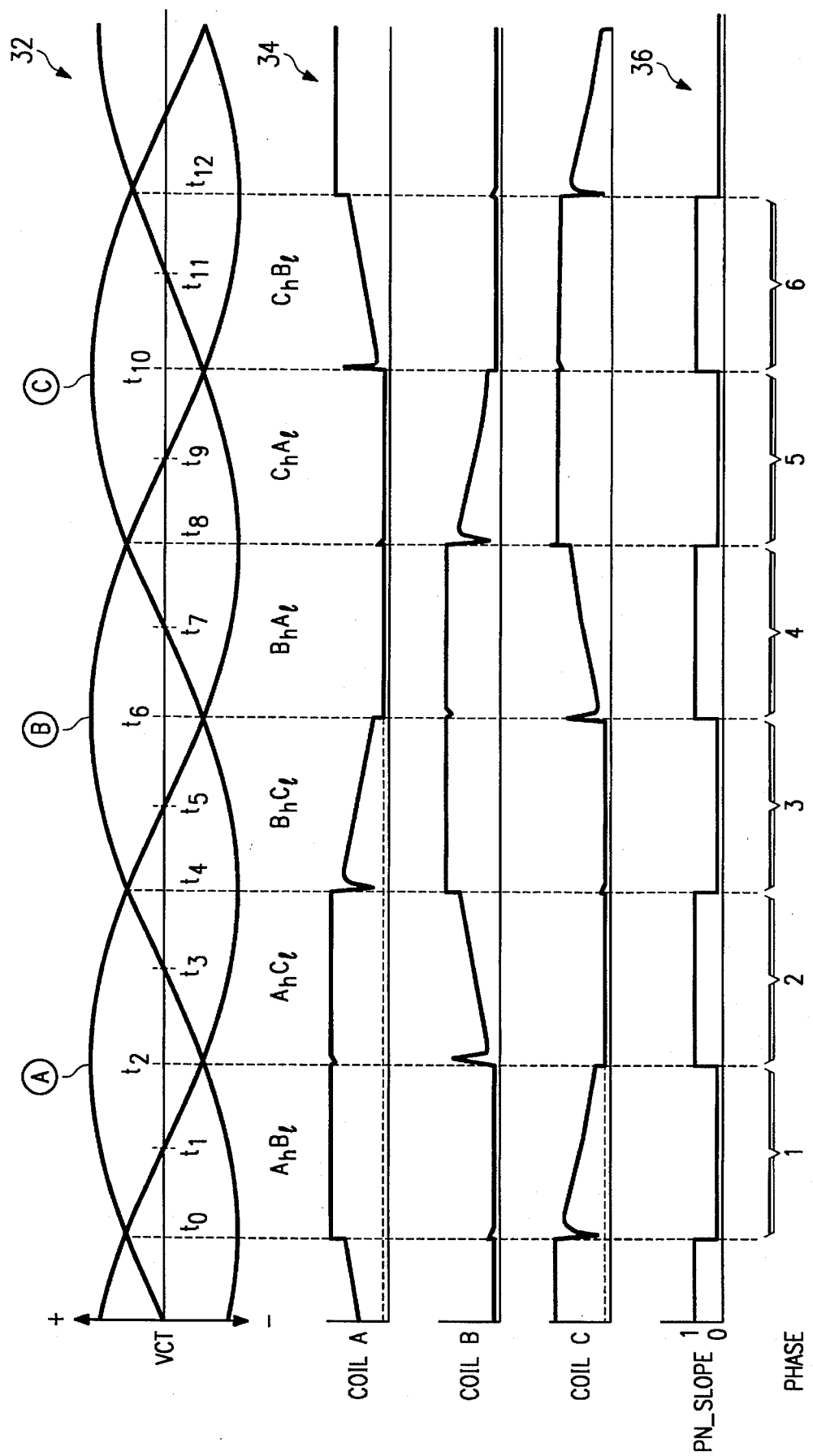
FIG. 2c illustrates a timing diagram of various signals representative of the bipolar sequence of operation for a motor.

FIG. 2c illustrates a timing diagram of various signals representative of the bipolar sequence of operation for motor 12. First, FIG. 2c illustrates the back emf curves 32 for each of coils A, B, and C (labeled accordingly). Second, FIG. 2c illustrates the voltage signals 34 across each coil when operating at the saturation speed (with it understood that the voltages are measured from OUTA, OUTB, and OUTC of FIG. 2a, respectively, with respect to ground). Third, FIG. 2c illustrates a pn_slope signal 36 described below.

Curves 32 and 34 of FIG. 2c are now traced given the illustrations of the above Figures and Table 1. Phase 1 occurs between $t_0$ and $t_2$. At $t_0$, the coils are commutated such that transistors $A_h$ and $B_l$ are on so that coils A and B conduct. Further, because the transistors for conducting coils operate in complementary fashion, $A_l$ and $B_h$ are off. Thus, referring to curves 34, the A coil voltage goes high and the B coil voltage goes low. Further, during this time, both $C_h$ and $C_l$ are off and, thus, coil C floats (note that some voltage is induced across the floating C coil). Note at $t_1$, the back emf across coil C equals the center tap voltage, VCT, and thus, $t_1$ defines a zero crossing. In the preferred embodiment, each commutation is 30 electrical degrees after a zero crossing. Consequently, at $t_2$, the next commutation occurs. Consistent with Table 1, therefore, at $t_2$, $A_h$ remains on and $C_l$ switches on (while $A_l$ remains off and $C_h$ remains off). Further $B_l$ is switched off while $B_h$ remains off. Thus, current flows from coil A to coil C, while coil B floats. At $t_3$, another zero crossing occurs, namely, the back emf of coil B equals VCT. Thus, 30 electrical degrees later, at $t_4$, another commutation occurs. Particularly, $A_h$ is switched off, and $B_h$ is switched on, and $C_l$ remains on. Thus, current flows from coil B to coil C, while coil A floats.

Note from the above that the commutations at $t_2$ and $t_4$ represent, respectively, a low side to low side commutation (from transistor 30B' to 30C') and a high side to high side commutation (from transistor 30A to transistor 30B). Thus, one skilled in the art will readily appreciate that commutations alternate, that is, between a low side to low side commutation to a high side to high side commutation, and this process continues throughout each phase of the bipolar sequence.

Turning now to pn_slope signal 36 of FIG. 2c, note that such a signal is a digital representation of the slope of the emf curve for the floating coil in the bipolar mode. This signal is the same as, or derives from, the slope signal shown coupled to zero crossing detector 28 in FIG. 1. Thus, the signal is known in the art and is used to control various operations within motors. Reviewing now FIG. 2c, during phase 1, coil C floats. Further, curve 32 indicates that the back emf slope for coil C during phase 1 is negative. Consequently, pn_slope is low during phase 1. As another example, following the commutation at $t_2$, and thus in phase 2, the back emf slope for the floating coil B is positive. Consequently, pn_slope is high during phase 2. One skilled in the art will therefore appreciate that pn_slope (and the analog slope of the back emf curve) transitions from high to low immediately following a high side to high side commutation, and from low to high immediately following a low side to low side commutation. This characteristic is beneficial in connection with the present invention for purposes discussed below.

Figure 3:
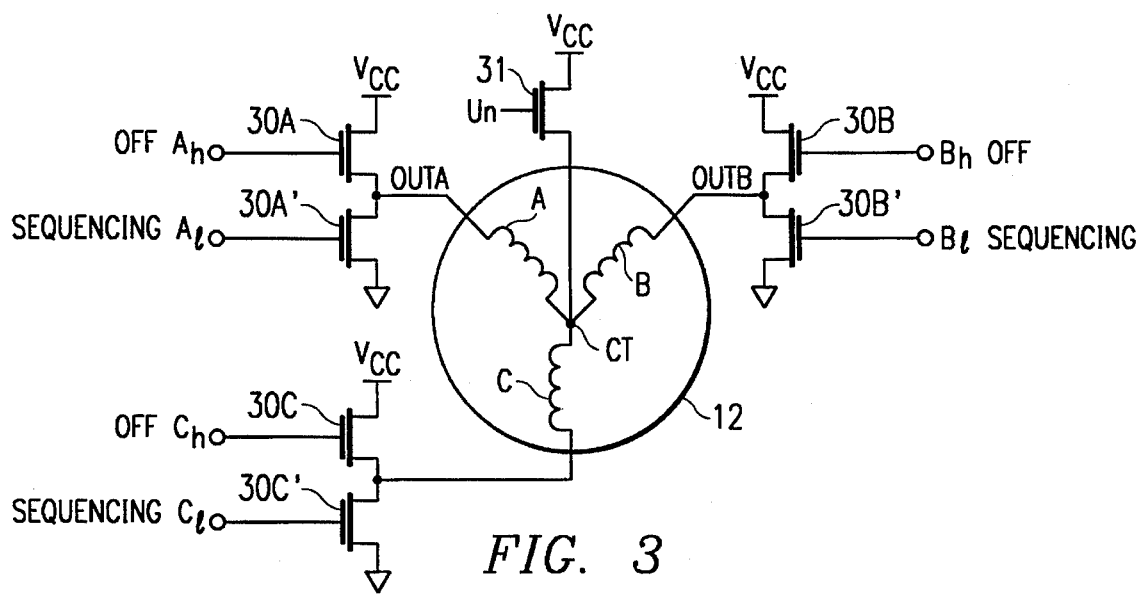
FIG. 3 illustrates the additional FET added to the embodiment of FIG. 2b to perform the unipolar mode.

Having described bipolar operation, recall for unipolar operation that only a single coil of coils A, B, and C is energized at a time. Thus, FIG. 3 illustrates that an additional FET is added to the embodiment of FIG. 2b to perform the unipolar mode. Particularly, a center tap FET 31 is coupled to the center tap node of motor 12. In the preferred embodiment, center tap FET 31 is operable to couple the center tap the voltage source, $V_{cc}$. Thus, in unipolar mode, to energize a particular single coil, the low side transistor of the single coil is turned on as is center tap FET 31. Thus, current flows through center tap FET 31, through the energized coil, and through the low side FET to ground (or to other circuitry coupled to a potential less than $V_{cc}$ and used to adjust the current flow). In other words, in unipolar mode, and as shown in FIG. 3, each of the low side transistors (i.e., 30A', 30B', and 30C') is sequenced while each of the high side transistors (i.e., 30A, 30B, and 30C) is off.

The above describes the use of both the bipolar and the unipolar mode of operation in connection with the present invention. An additional aspect, however, accommodates the switching between the bipolar and unipolar mode. In the preferred embodiment, such switching is initiated by an external request at input 18, with it understood that an internal request also could be used with the present invention. As described above, motor 12 operates in the bipolar mode as a default mode unless there is a request to switch to unipolar. Further, once in unipolar mode, the motor returns (i.e., defaults) back to the bipolar mode after the unipolar request no longer exists. In connection with the present invention, however, it has been determined that responding to this request (i.e., either by switching from bipolar to unipolar mode, or by defaulting from unipolar mode back to bipolar mode) at a random time may have negative effects on the operation of the motor. For example, it also has been determined when there is a switch between bipolar mode and unipolar mode near a zero-crossing point, the switch changes the back emf across the stator coils and, therefore, also changes the point of the zero-crossing. This change may, in turn, disturb the motor sequencing, as well as cause a large temporary decrease, or change, in motor torque.

Given the above, under the present invention, the switching of operation between the bipolar mode and unipolar mode is shifted to occur away from the point of a zero crossing. Consequently, the undesirable results of changing modes near the zero crossing are substantially reduced. Particularly, recall from FIG. 2c that zero crossings occur every 60 electrical degrees in the preferred embodiment. Thus, in the preferred embodiment, the switch between bipolar mode and unipolar mode is performed at or substantially near the midpoint between successive zero crossings; in other words, the mode switch occurs at approximately 30 electrical degrees following a zero crossing (and consequently, 30 electrical degrees before the next zero crossing). Consequently, switching at such a midpoint minimizes the effects of a node change occurring near a zero crossing point.

Figure 4:
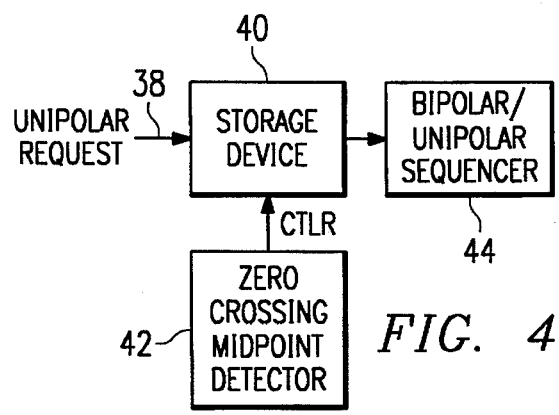
FIG. 4 illustrates a block diagram of the preferred components for controlling the timing of switching between bipolar mode and unipolar mode in accordance with the present invention.

FIG. 4 illustrates a block diagram of the preferred components for controlling the timing of switching between bipolar mode and unipolar mode in accordance with the present invention. A request input 38 is coupled to receive a unipolar request, that is, a request that the motor operation switch from bipolar mode to unipolar mode. Again, the request may be internally or externally generated. Request input 38 is coupled to the data input of a storage device 40. The control input of storage device 40 is coupled to the output of a zero crossing midpoint detector 42. The output of storage device 40 is coupled to a bipolar/unipolar sequencer 44.

The operation of the blocks of FIG. 4 is as follows. Initially, sequencer 44 is outputting the appropriate signals so that a motor (such as motor 12) commutates to operate in the bipolar mode of operation (i.e., by default). At some point, such as when torque reaches a certain level, a request to switch to unipolar mode is generated and connected to input 38; thus, in the example of FIG. 4, the signal labeled UNIPOLAR goes high. Storage device 40 stores the request, but does not yet issue it to sequencer 44. Instead, storage device 40 awaits control of zero crossing midpoint detector 42. Zero crossing midpoint detector 42 detects the midpoint between zero crossings and, upon detecting such point, provides an enable signal to storage device 40. Upon receiving the enable signal, storage device 40 outputs the stored unipolar request to sequencer 44. Thus, the request arrives at sequencer 44 at substantially the midpoint in time between zero crossings. Consequently, sequencer 44 switches from bipolar mode to unipolar mode at substantially the midpoint in time between zero crossings, and thereby accomplishes the preferred function and result set forth above.

Note further that the components of FIG. 4 operate in a similar manner when switching back to the default mode, that is, from unipolar mode to bipolar mode. Particularly, once in the unipolar mode, at some point it may be desirable to return operation of the motor to the bipolar mode. At such a point, the request to switch to unipolar mode is disabled; thus, in the example of FIG. 4, the signal labeled UNIPOLAR goes low and, this unipolar disable signal is connected to input 38. Storage device 40 stores the signal change (i.e., release of the unipolar request) but, again, does not notify sequencer 44. Instead, storage device 40 awaits control of zero crossing midpoint detector 42. Zero crossing midpoint detector 42 detects the midpoint between zero crossings and, upon detecting such point, provides the enable signal to storage device 40. Upon receiving the enable signal, storage device 40 outputs the stored unipolar disable signal to sequencer 44. Thus, the request to disable the unipolar mode arrives at sequencer 44 at substantially the midpoint in time between zero crossings. Consequently, sequencer 44 switches from unipolar mode to bipolar mode at substantially the midpoint in time between zero crossings, and thereby accomplishes the preferred function and result set forth above.

From the above, it may be appreciated that the preferred embodiment operates to switch the motor between modes in response to a mode change signal. In the exemplary embodiment, the mode change signal is indicated as UNIPOLAR, and is high (i.e., active) to request a change from the bipolar mode to the unipolar mode, and is low (i.e., deactivated) to request a change from unipolar mode to bipolar mode. The deactivation of UNIPOLAR ultimately causes the switch to bipolar mode because sequencer 16 defaults to such a mode when there is no request to be in the unipolar mode. However, without such a default arrangement, it should be understood that a separate input could be included for a separate bipolar mode request. In any event, the preferred embodiment may be modified for any type of mode change signal, by default or otherwise, where the signal indicates the need to switch between the unipolar and bipolar modes of operation.

Figure 5:
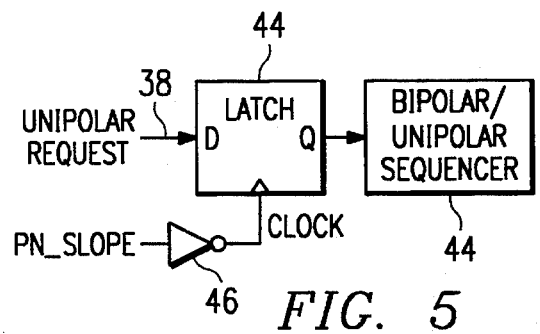
FIG. 5 illustrates the preferred embodiment for performing the block functions set forth in FIG. 4.

FIG. 5 illustrates the preferred embodiment for performing the block functions set forth in FIG. 4, above. Comparing FIGS. 4 and 5, note that the storage device 44 preferably comprises a latch (or D flip-flop). The data input of the latch is coupled to receive the request to switch between the bipolar mode and the unipolar mode. For detector 42, the pn_slope signal discussed above is coupled through an inverter 46 and coupled to the clock input of the latch. Thus, each time pn_slope transitions from high to low, the latch is clocked and its data is passed to sequencer 44. As a result, once a unipolar request (i.e., either enable or disable) is received, it is delayed until pn_slope transitions from high to low, and is then passed on to sequencer 44. Recall that pn_slope transitions at or near the midpoint between zero crossings. Thus, when pn_slope transitions (at or near the midpoint between zero crossings), the data from the latch is clocked to sequencer 44 which, in turn, switches between bipolar mode and unipolar mode at or near the midpoint between zero crossings.

Recall further from FIG. 2c that pn_slope transitions from high to low only in response to high side to high side commutations. Thus, note further that sequencer 44 switches between bipolar mode and unipolar mode only in response to high side to high side commutations (as opposed to responding also to low side to low side commutations). This operation is preferred given that the center tap is pulled to $V_{cc}$ when switching to unipolar mode. Specifically, note in FIG. 2c that a positive spike often is applied to a coil on low side to low side commutations (e.g., between phases 1 and 2). This positive spike, in combination with the sudden connection of an FET to $V_{cc}$, may have undesirable effects. For example, if sequencer 44 switched to unipolar mode during a low side to low side commutation, the driving center tap FET would be coupled to this spike and, thus, may break down. In contrast, by switching to unipolar mode during (or immediately after) a high side to high side commutation, a negative spike may be encountered which will not present the same problem.

One skilled in the art also will appreciate the preferred modification if the motor center tap is coupled to ground (or near ground) during unipolar mode as opposed to $V_{cc}$. Particularly, and given the above, inverter 46 is preferably removed in such an instance, thereby delaying the switch between bipolar mode and unipolar mode until a low side to low side commutation occurs.

From the above, it may be appreciated that the embodiments of the present invention provide a method and apparatus for switching a motor between bipolar mode and unipolar mode at a controlled time. The embodiments of FIGS. 4 and 5 are preferably incorporated into controller 10 of FIG. 1, such as including them in control circuit 14 and using back emf amplifier 26 and zero crossing detector 28. As a result, the improved controller provides advantageous over the prior art, such as reducing the effects on spindle sequencing and motor torque. Further, while the preferred embodiment has been included, alternatives have been provided demonstrating the inventive scope. Consequently, while the present invention has been described in detail, various substitutions, modifications or alterations could be made to the descriptions set forth above without departing from the invention which is defined by the following claims.

What is claimed is:

1. A method of switching a motor between a bipolar mode and a unipolar mode, wherein the motor comprises a center tap and a plurality of coils and wherein, during each phase of said bipolar mode, one of said coils comprises a floating coil having a back emf, the method comprising the steps of:

first receiving a mode change signal requesting a change between the bipolar mode and the unipolar mode;

second, monitoring said back emf across said floating coils;

third, detecting a point in time when said back emf equals said center tap voltage; and fourth, switching between the bipolar mode and the unipolar mode at a point in time after said point in time but before a second point in time where said back emf equals said center tap voltage.

2. The method of claim 1 wherein said step of detecting a point in time comprises detecting a commutation of current between said plurality of coils.

3. The method of claim 2 wherein said commutation of current occurs at a first time and a second time, and wherein step of switching between the bipolar mode and the unipolar mode comprises switching between the bipolar mode and the unipolar mode at substantially a midpoint in time between said first time and said second time.

4. The method of claim 1 wherein each of said plurality of coils is coupled at a respective first node to said center tap and at a respective second node to a respective power circuit for selectively coupling a respective coil to a high voltage potential and a low voltage potential, and wherein said step of switching between the bipolar mode and the unipolar mode comprises switching between the bipolar mode and the unipolar mode in response to a first of said power circuits disconnecting said high voltage potential from said second node of a respective first coil simultaneously with a second of said power circuits connecting said high voltage potential to said second node of a respective second coil.

5. The method of claim 4 wherein said center tap is coupled to a center tap power circuit for selectively coupling said center tap to a high voltage potential and a low voltage potential, and further comprising the steps of, responsive to said fourth step of switching between the bipolar mode and the unipolar mode:

coupling said center tap to said high voltage potential; and coupling said low voltage potential to said second node of a respective one of said plurality of coils such that only said one of said plurality of coils conducts current.

6. A method of switching a motor between a bipolar mode and a unipolar mode, comprising the steps of:

first, receiving a mode change signal requesting a change between the bipolar mode and the unipolar mode;

second, detecting a high to high commutation cycle; and third, switching between the bipolar mode and the unipolar mode in response to both said first and second steps.

7. The method of claim 6 wherein said commutation cycle comprises a first commutation cycle occurring at a first point in time and is followed by a second commutation cycle occurring at a second point in time, and wherein said third step comprises switching between the bipolar mode and the unipolar mode at substantially a midpoint in time between said first time and said second time.

8. A circuit for switching a motor between a bipolar mode and a unipolar mode, wherein said motor comprises a plurality of coils and wherein, during each phase of said bipolar mode, one of said coils comprises a floating coil having a back emf, said circuit for switching a motor comprising:

an input for receiving a mode change signal requesting a change between the bipolar mode and the unipolar mode;

circuitry for detecting a commutation cycle comprising slope circuitry for determining a slope of said back emf for said floating coil; and circuitry for switching between the bipolar mode and the unipolar mode in response to said mode change signal and said circuitry for detecting a commutation cycle.

9. The circuit of claim 8 and further comprising storage circuitry for storing said mode change signal, wherein said circuitry for detecting a commutation cycle controls said storage circuitry to output said mode change signal to said circuitry for switching at a selected time.

10. The circuit of claim 8 wherein said circuitry for detecting a commutation cycle comprises circuitry for detecting a midpoint between successive commutation cycles.

11. The circuit of claim 8 wherein said circuitry for detecting a commutation cycle further comprises circuitry, responsive to said slope circuitry, for outputting a control signal indicating a change in transition from a positive slope to a negative slope.

12. The circuit of claim 8 and further comprising:

storage circuitry for storing said mode change signal, said storage circuitry comprising a clock input, a data output, and an input coupled to said input for receiving a mode change signal;

wherein said motor comprises a plurality of coils and wherein, during each phase of said bipolar mode, one of said coils comprises a floating coil having a back emf, and wherein said circuitry for detecting a commutation cycle comprises:

slope circuitry for determining a slope of said back emf of said floating coil; and transition circuitry, responsive to said slope circuitry, for outputting a control signal indicating a change in transition from a positive slope to a negative slope, wherein said control signal is coupled to said clock input of said storage circuitry; and wherein said data output of said storage circuitry is coupled to said circuitry for switching between the bipolar mode and the unipolar mode such that said storage circuitry outputs said mode change signal to said circuitry for switching in response to receiving said control signal at said clock input.

13. A motor controller circuit comprising:

a power circuit operable to output a plurality of voltage potentials to a respective plurality of coils of a motor;

a sequence circuit coupled to said power circuit for controlling the sequence of operation of said power circuit;

an input for receiving a mode change signal requesting a change between the bipolar mode and the unipolar mode;

circuitry for detecting a high to high commutation cycle; and circuitry for switching between the bipolar mode and the unipolar mode in response to said mode change signal and said circuitry for detecting a high to high commutation cycle.

* * * * *